(12) United States Patent
Metzler et al.

(10) Patent No.: US 9,047,536 B2
(45) Date of Patent: Jun. 2, 2015

(54) METHOD FOR PROVIDING TARGET POINT CANDIDATES FOR SELECTING A TARGET POINT

(75) Inventors: Bernhard Metzler, Dornbirn (AT);
Stefan Martin Benjamin Gaechter Toya, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 10 days.

(21) Appl. No.: 14/114,888

(22) PCT Filed: Jul. 3, 2012

(86) PCT No.: PCT/EP2012/062936
§ 371 (c)(1),
(2), (4) Date: Oct. 30, 2013

(87) PCT Pub. No.: WO2013/004700
PCT Pub. Date: Jan. 10, 2013

(65) Prior Publication Data
US 2014/0105457 A1   Apr. 17, 2014

(30) Foreign Application Priority Data
Jul. 5, 2011   (EP) ..................................... 11172756

(51) Int. Cl.
*G06K 9/00* (2006.01)
*G06K 9/46* (2006.01)
*G01C 1/04* (2006.01)
*G01C 15/00* (2006.01)
(Continued)

(52) U.S. Cl.
CPC .. *G06K 9/46* (2013.01); *G01C 1/04* (2013.01); *G01C 15/002* (2013.01); *G06K 9/6267* (2013.01); *G06T 7/0042* (2013.01)

(58) Field of Classification Search
None
See application file for complete search history.

(56) References Cited

U.S. PATENT DOCUMENTS

| 6,731,329 B1 * | 5/2004 | Feist et al. ..................... 348/135 |
| 2006/0192946 A1 * | 8/2006 | Walser ........................... 356/144 |
| 2011/0285592 A1 * | 11/2011 | Green et al. .................. 342/451 |

FOREIGN PATENT DOCUMENTS

| DE | 19710722 | 10/1997 |
| DE | 19926706 | 12/1999 |

(Continued)

OTHER PUBLICATIONS

European Search Report dated Dec. 8, 2011 as received in Application No. EP 11 17 2756.

*Primary Examiner* — Amara Abdi
(74) *Attorney, Agent, or Firm* — Maschoff Brennan

(57) ABSTRACT

Method for providing target point candidates forming a candidate set for selecting a target point from the candidate set by means of a geodetic measuring device. The measuring device is coarsely oriented toward the target point, and an image is recorded in the sighting direction. A search process for certain target object candidates in the recorded image is performed by means of image processing and wherein at least one respective point representing the target object candidate is associated with each of the target object candidates as a target point candidate. Candidates are associated with a candidate set. respective weight values are derived according to at least one value of a predetermined target point property of the candidates and associated with the target point candidates. The target point candidates from the candidate set are each provided together with respective information representing the weight value associated with the target point candidate.

23 Claims, 5 Drawing Sheets

(51) Int. Cl.
  *G06K 9/62* (2006.01)
  *G06T 7/00* (2006.01)

(56) References Cited

FOREIGN PATENT DOCUMENTS

| | | |
|---|---|---|
| DE | 19949580 | 4/2000 |
| DE | 199 22 341 A1 | 11/2000 |
| DE | 19922341 | 11/2000 |
| EP | 1081459 | 3/2001 |
| EP | 1662278 | 5/2006 |
| EP | 1686350 | 8/2006 |
| EP | 2141450 | 1/2010 |
| EP | 2 194 399 A1 | 6/2010 |
| EP | 2194399 | 6/2010 |
| EP | 2219011 | 8/2010 |
| EP | 2405236 | 1/2012 |
| WO | 2005026767 | 3/2005 |
| WO | 2006053837 | 5/2006 |

* cited by examiner

METHOD FOR PROVIDING TARGET POINT CANDIDATES FOR SELECTING A TARGET POINT

FIELD OF THE INVENTION

The invention relates to a method for providing target point candidates for selecting a target point from a candidate set by means of a measuring device and to a measuring device.

BACKGROUND

For measuring a target point, numerous geodetic measuring devices have been known since ancient times. In this case, direction or angle and usually also distance from a measuring device to the target point to be measured are recorded and, in particular, the absolute position of the measuring device together with reference points possibly present are detected as spatial standard data.

Generally known examples of such geodetic measuring devices include the theodolite, tachymeter and total station, which is also designated as electronic tachymeter or computer tachymeter. One geodetic measuring device from the prior art is described in the publication document EP 1 686 350, for example. Such devices have electrical-sensor-based angle and, if appropriate, distance measuring functions that permit direction and distance to be determined with respect to a selected target. In this case, the angle and distance variables are determined in the internal reference system of the device and, if appropriate, also have to be combined with an external reference system for absolute position determination.

In many geodetic applications, points are measured by specifically configured target objects being positioned there. The latter usually consist of a plumb staff with a reflector (e.g. an all-round prism) for defining the measurement path or the measurement point. In the case of such measurement tasks, for controlling the measurement process and for defining or registering measurement parameters, a number of data, instructions, speech and further information are transmitted between target object—in particular a handheld data acquisition device at the target object—and central measuring device. Examples of such data include the identification of the target object (type of prism used), inclination of the plumb staff, height of the reflector above ground, reflector constants or measurement values such as temperature or air pressure. These information items or situation-governed parameters are necessary for enabling highly precise targeting and measurement of the measurement point defined by the plumb rod with prism.

Modern total stations have microprocessors for digital further processing and storage of detected measurement data. The devices generally have a compact and integrated design, wherein coaxial distance measuring elements and also computing, control and storage units are usually present in a device. Depending on the expansion stage of the total station, motorization of the targeting or sighting device and—in the case of the use of retroreflectors (for instance an all-round prism) as target objects—means for automatic target seeking and tracking can additionally be integrated. As a human-machine interface, the total station can have an electronic display control unit—generally a microprocessor computing unit with electronic data storage means—with display and input means, e.g. a keyboard. The measurement data detected in an electrical-sensor-based manner are fed to the display control unit, such that the position of the target point can be determined, optically displayed and stored by the display control unit. Total stations known from the prior art can furthermore have a radio data interface for setting up a radio link to external peripheral components such as e.g. a handheld data acquisition device, which can be designed, in particular, as a data logger or field computer.

For sighting or targeting the target point to be measured, geodetic measuring devices of the generic type have a telescopic sight, such as e.g. an optical telescope, as sighting device. The telescopic sight is generally rotatable about a vertical axis and about a horizontal tilting axis relative to a base of the measuring device, such that the telescopic sight can be aligned with the point to be measured by pivoting and tilting. Modern devices can have, in addition to the optical viewing channel, a camera for detecting an image, said camera being integrated into the telescopic sight and being aligned for example coaxially or in a parallel fashion, wherein the detected image can be represented, in particular, as a live image on the display of the display control unit and/or on a display of the peripheral device—such as e.g. the data logger—used for remote control. In this case, the optical system of the sighting device can have a manual focus—for example an adjusting screw for altering the position of a focusing optical system—or an autofocus, wherein the focus position is altered e.g. by servomotors. By way of example, such a sighting device of a geodetic measuring device is described in EP 2 219 011. Automatic focusing devices for telescopic sights of geodetic devices are known e.g. from DE 197 107 22, DE 199 267 06 or DE 199 495 80.

The optical system or the optical viewing channel of the sighting device usually contains an objective lens group, an image reversal system, a focusing optical system, a reticle for producing a reticle and an eyepiece, which are arranged e.g. in this order from the object side. The position of the focusing lens group is set depending on the object distance in such a way that a sharp object image arises on the reticle arranged in the focusing plane. Said image can then be viewed through the eyepiece or e.g. detected with the aid of a camera arranged coaxially.

By way of example, the construction of generic telescopic sights of geodetic devices is disclosed in the publication documents EP 1 081 459 or EP 1 662 278.

On account of the beam path that is usually to be utilized jointly both as viewing channel and for measurements, such devices require the technical design of said beam path in the manner of construction of a telescope with specialized, high-precision optical systems that are to be produced with a high outlay. Furthermore, an additional separate transmitting and receiving channel and also an additional image plane for the wavelength of the distance measuring device are provided for the coaxial electronic distance measurement.

Since target objects (e.g. the plumb rods with target mark, such as an all-round prism, which are usually used for geodetic purposes) can be targeted sufficiently precisely with the naked eye on the basis of the sighting device despite the 30-fold optical magnification often provided (i.e. not conforming to geodetic accuracy requirements), conventional measuring devices in the meantime have as standard an automatic target tracking function for prisms serving as target reflector (ATR: "Automatic Target Recognition"). For this, a further separate ATR light source—e.g. a multimode fiber output, which emits optical radiation having a wavelength in the range of 850 nm—and a specific ATR detector (e.g. CCD area sensor) sensitive to said wavelength are conventionally additionally integrated in the telescope.

In the context of the ATR fine targeting function, in this case the ATR measurement beam is emitted in the direction of the optical targeting axis of the sighting device and is retroreflected at the prism and the reflected beam is detected by the ATR sensor. Depending on the deviation of the alignment of the optical targeting axis from the prism, in this case the impingement position of the reflected radiation on the ATR sensor also deviates from a central sensor area positioning rate (i.e. the reflection spot of the ATR measurement beam retroreflected at the prism on the ATR area sensor does not lie in the center of the ATR area sensor and therefore does not impinge on a desired position defined e.g. on the basis of calibration as that position which corresponds to the optical targeting axis).

If this is the case, if the alignment of the sighting device is slightly readjusted in a motorized manner in such a way that the ATR measurement beam retroreflected at the prism impinges highly precisely in the center of the sensor area on the ATR area sensor (i.e. the horizontal and vertical angles of the sighting device are thus iteratively changed and adapted until the center of the reflection spot coincides with the desired position on the ATR area sensor). Alternatively, a residual deviation between the impingement point of the retroreflected ATR measurement beam on the ATR area sensor and the center of the sensor area can also be taken into account computationally and converted into an angle, which is correspondingly added to the solid angle—detected with the aid of the angle sensors—at which the targeting axis points. In other words, the solid angle with respect to the target point can in this case also be derived from the solid angle—detected with the aid of the angle sensors—of the targeting axis and an offset of the detected ATR measurement beam reflection from the sensor center (i.e. from that central point on the ATR sensor at which the targeting axis is imaged).

As a result, the achievable accuracy in the alignment of the optical targeting axis with the prism can be significantly increased by comparison with manually performed targeting with a reticle and on the basis of measurement by the naked eye. In order to ensure the functioning of the automatic targeting on the basis of evaluation of the position of the reflection spot of the ATR measurement beam retroreflected at the prism on the ATR area sensor, it is necessary, before the function starts, to align the sighting device with the target reflector at least approximately in such a way that the retroreflected ATR measurement beam also impinges on the ATR area sensor. For this purpose, it is possible e.g. beforehand to effect manual targeting of the target reflector on the basis of measurement by eye or to perform an automatic coarse targeting function.

The manual, coarse sighting of the target object can be effected by the user, on the one hand, by viewing and targeting the target object on a user display of the display control unit directly on the measuring device or on the display of a separate peripheral device (e.g. data logger as remote control). Often, however, this is still effected by means of viewing the target through the eyepiece of the telescopic sight (i.e. of the sighting device), since a displayed display image on the display control unit or the data logger may be insufficiently recognizable during use in practice—e.g. in the case of insolation.

Besides the ATR fine targeting function, an automatic target tracking functionality can also be provided in a similar manner and using the same ATR components (such as ATR light source and ATR detector). After ATR fine targeting has been effected (i.e. once the sighting device is aligned with the target in such a way that the center of the ATR measurement radiation reflection spot coincides with the desired position—corresponding to the targeting axis—on the ATR area sensor), the sighting device can furthermore be tracked to movements of the target "live" and appropriately rapidly in such a way that the center of the ATR measurement radiation reflection spot furthermore remains as accurately as possible and always on the desired position on the ATR area sensor. It is then often stated that the target is "locked on". Problems can occur here if the target moves so jerkily and rapidly that it disappears from the field of view of the ATR detector (i.e. ATR measurement radiation reflected at the target no longer impinges on the ATR area sensor).

By way of example, EP 2 141 450 describes a measuring device having a function for automatic targeting of a retroreflective target and having an automatic target tracking functionality. In order in this case, even in the event of rapid and jerky movements, to keep the target in the "locked on" state and not to lose it from the field of view of the fine targeting detector, it is proposed to record images of the target in parallel by means of a camera (which is sensitive in the visible wavelength range) and, with the aid of image processing, to track movements of the target (or movements of objects which move concomitantly together with the target), and thereby to make it easier for the retroreflector to be found again and locked on again in the case of the target being lost from the "locked on" state.

Furthermore, the prior art discloses methods wherein the solid angles between the measuring device and a target object are determined with the aid of an image and image processing (in particular on the basis of a position of a target object determined in the recorded image and depending on a known or also detected image recording direction). Such methods are described e.g. in WO 2005/026767 or in WO 2006/053837.

Moreover, European patent application No. 10168771.3 describes a motorized and automatic alignment of a targeting device of a measuring device with a target point of a (retroreflectorless) target mark. In this case, the target mark (or a set of different target marks) is previously known and has a structure/shape (pattern, form, etc.) suitable for indicating the target point on the target mark. By means of an evaluation unit, in a detected image, the target mark is identified on the basis of the pattern and the position of the imaged target mark in the image is determined highly precisely. Depending on this determined position of the target mark or of a pattern correlated with the target mark in the image, the targeting device can then be precisely aligned.

One disadvantage of measuring devices according to the prior art is, on the one hand, the given requirement of manual fine alignment of the targeting device with a target point. This can have a limiting effect on the accuracy during the measurement of the solid angles, since this process is dependent on the care and ability of the user. Furthermore, manual accurate targeting of a target point is associated with a certain time expenditure which has an adverse effect on the user's productivity.

On the other hand, the automatic fine targeting in measuring devices according to the prior art is limited to defined targets. In this regard, the ATR fine targeting function described functions only for cooperative targets, such as e.g. prisms, and not for natural target points. Other methods of automatic fine targeting function only for defined patterns, e.g. for target marks whose forms are known to the system, and not for objects having a certain variability in their shape, e.g. church towers.

SUMMARY

Therefore, it is an object of the present invention to provide a method by which a selection of a desired target point can be carried out with a high degree of automation, with less complexity, more rapidly and more reliably. A further object of the invention is to make it possible to take account of a variability of possible target object types, in particular with regard to their shape, in the selection. A specific object of the invention is to make it possible, in the selection of the desired target point, to take account of properties ascribed to the target point, in particular for supporting the selection. A further object is to provide a geodetic measuring device for such a method.

These objects are achieved by means of the realization of the characterizing features of the independent claims. Features which develop the invention in an alternative or advantageous manner can be gathered from the dependent patent claims.

The invention provides a method for providing target point candidates together with a respective indicator for a weighting of the candidates or a target point probability.

In this case, after a coarse alignment of a targeting unit, in particular of a telescope, of a measuring device with an integrated camera an image is recorded, which is analyzed on the basis of methods of digital image processing with regard to possible target objects or target object candidates. Target points or target point candidates are derived from the target objects or target object candidates. The target point candidates determined can be provided together with an associated probability of being appropriate as target point desired by the user, e.g. on a display. From the set of candidates provided, the system can automatically select a point as desired target point or, in the case of ambiguity, offer a predefined number of the candidates, in particular those having the highest probability, to a user for manual selection thereof. After the automatic or manual selection, on the basis of the image information, the deviation of the targeting unit from the direction to the selected target point can be calculated and the measuring device can be aligned with the target point by means of drives provided for pivoting.

The method according to the invention for providing target point candidates that form a candidate set for selecting a target point from the candidate set is effected by means of a geodetic measuring device, wherein the measuring device has a targeting unit defining a targeting direction and a camera aligned substantially in the targeting direction. In this case, the measuring device is coarsely aligned with the target point and an image in the targeting direction is detected.

In this case, the camera of the measuring device can define a second beam path and thus a detection direction, for example, which is not coaxial or absolutely parallel with respect to the beam path of the targeting unit. By way of example, the camera and the optical system thereof have a magnification factor which is lower than that of the targeting unit, in order e.g. to be able to record an overview image for orientation purposes, and is therefore arranged in a manner offset in particular below, with respect to a targeting optical system. Therefore, the alignment of the camera does not have to correspond to the alignment of the targeting unit, but the camera can be substantially aligned in the targeting direction, i.e. for example in such a way that a target point that can be targeted by the targeting unit lies in the detection region of the camera.

Furthermore, a process of searching for specific target object candidates in the detected image is effected by means of image processing, in particular by means of a classification method, wherein the search process is effected on the basis of predefined models and the target object candidates are respectively assigned at least one point representing the respective target object candidate as target point candidates. Moreover, the target point candidates are assigned to a candidate set and a respective weight value, in particular a probability, depending on at least one embodiment of a predetermined target point property of the target point candidate, is derived and assigned to the target point candidates. Furthermore, the target point candidates of the candidate set are respectively provided together with an information item representing the weight value assigned to the respective target point candidate.

In particular, at least one target object candidate can be provided, whereby a target point assigned to the object, in particular for targeting this point, is implicitly also provided. In this regard, e.g. a user or the system can be offered information about what target points and/or target objects were identified in each case with what probability of being appropriate as target point, and a corresponding selection can furthermore be carried out in an object-based and/or point-based manner. Thus, within the meaning of the invention, providing target objects corresponds to simultaneously providing a target point assigned to the target object and can in this regard likewise be understood as providing target points. In this regard, providing a target point or target point candidates can be realized both by individual points and by defined structures, for example objects.

Therefore, a process of searching for target object candidates in the detected image is effected, wherein the image is examined with regard to the occurrence of representatives of predefined target object classes. If one or a plurality of target object candidates are found in the image, for these the corresponding target points are determined or assigned and the latter are rated on the basis of defined weight factors with regard to a probability or a weight value regarding the extent to which the individual candidates involve the one target point desired by the user. After a selection has been carried out, in accordance with the target point candidate selected, an angular offset from the current target direction can be determined and the alignment e.g. of a telescope of a total station can be corrected by means of motorization in accordance with the offset.

Weight value is understood here to be a variable which indicates the extent to which a target point candidate is appropriate as desired target point. Said weight value can furthermore be interpreted as a probability, wherein it is possible to indicate with what probability a target point candidate is appropriate as target point.

In other words, the weight value is a measure of a relevance, for example a relevance value represented by an information item for being appropriate as desired target point with regard to a respective target point candidate. In particular, in this case a relevance characteristic value can also be understood as a weight value, wherein the relevance characteristic value represents a scalable characteristic variable regarding the extent to which a target point candidate represents the desired target point.

In other words, the weight value can be taken to express the extent to which a value assigned to the target point candidate reflects a target point significance, i.e. indicates a significance in respect to the fact that a target point candidate represents the desired target point.

The determination or assignment of the target points on the basis of the target objects can be effected in a rule-based manner in this case, that is to say that if a representative of a target object class is found in the image, the target points can be defined as points of intersection of lines or as mid points of circles or ellipses. In this regard, e.g. in the case of a representative of the target object class "church tower", one target point can be derived as a point of intersection of the bars (identified as lines in the detected image) of the cross and a further target point can be derived as a midpoint of the cupola (identified as a circle in the detected image). These rules for deriving the target points can be assigned to the respective target object class and stored on the measuring device.

Such a method enables a user to select a desired target point from a set of provided target point candidates in a measurement environment. As an alternative thereto, the target point can be selected automatically in the context of the method. As a result, after a coarse alignment of a measuring system, a target point can be automatically selected and the system can be automatically aligned. If an automatic target point selection is unsuccessful on account of ambiguities, the user can be offered e.g. the most probable target point candidates for manual selection. Therefore, the complicated fine targeting after the manual coarse targeting can be effected automatically and the productivity of a measurement process can be increased.

In order to provide the target point candidates, an image of a measurement environment is detected, wherein during detection of the image the measuring device with the camera, e.g. a total station or a theodolite, is aligned in such a way that the desired target point is coarsely targeted and the detection direction of the camera is thus substantially aligned with this point and the latter is therefore situated in the image field of the camera. The detected image is examined with regard to the occurrence of target object candidates, numerous methods, in particular classification methods, being known for this purpose from image processing. Firstly, features can be extracted from an image excerpt and can be combined in a feature vector (e.g. Haar wavelet or HOG features). Said feature vector can be mapped into the feature space and assigned to a target object class depending on the position in this space. In this case, the image excerpt can be selected by means of a window of defined size which is slid or scanned progressively e.g. line by line over the entire image (sliding window).

Furthermore, in order to define the image excerpts, the image can be analyzed with regard to the occurrence of permanent structures, the so-called "interest points", e.g. by means of Förstner operator, Harris-Laplace detector and/or Harris corner and edge detector. It is thus possible to localize prominent structures in the image, and the surroundings of said structures can in turn define a specific image excerpt on the basis of which the feature vector is calculated.

Such "interest points" can for example also be made available by a subsystem, e.g. an ATR unit (automatic target recognition), wherein, by means of an additional radiation source, the positions e.g. of reflective targets can be detected and the latter can be targeted. By means of a subsequent image analysis of the environment of an "ATR interest point", it is thus possible to improve the robustness of the ATR function with regard to differentiation between ATR targets and non-ATR targets. In this case, e.g. the image environment can be examined for structures which can represent a retroreflector.

As a further variant for defining the image excerpts from which the feature vectors are calculated, on the basis of the coordinates of known target points, e.g. of fixed points from official measurement, in accordance with the position and alignment of the camera, it is possible to calculate the position thereof in the image. In this case, the image excerpt can be defined by a predefined environment around this position.

In this regard, by way of example, each feature vector can in this case be fed to a classifier. By means of the classifier, it is possible to determine an association of the respective feature vector with a predefined class and to determine the assignment probability or feature probability of said feature vector, i.e. the quality of the assignment.

Following a further method for detecting target objects in a recorded image, the latter can in turn be searched for "interest points". These "interest points" define the position of the image excerpts from which feature vectors (e.g. SIFT or SURF) are generated. In the context of the classification, the positions of the "interest points" in combination with the calculated feature vectors are compared with object models stored in the system and corresponding to the target object classes, and their association is rated.

Furthermore, the image can also be searched for geometrical primitives, such as e.g. circles, ellipses or lines, e.g. by means of Hough transformation. On the basis of the neighborhood relationships of the detected primitives it is possible to establish a topology graph of the image, said graph being searched in the context of a classification for different stored reference graph structures corresponding to individual target object classes.

From a classification of the target object candidates with regard to their association with the candidate set, i.e. whether or not the object detected in the image is a possible target object, alongside the assignment to a target object class an assignment probability can also arise, which describes the quality of the respective assignment.

With such a classification, therefore, it is possible not only to take a decision about taking account of an identified possible target object, i.e. target point or not target point, but also to carry out a further detailed subdivision of possible target objects (and the associated target points) into different classes, e.g. round prism or house edge. This class division and the assignment probability can furthermore be taken into account for a determination of the weight value or the probability that the respective target point candidate represents the target point desired by the user, or can influence the calculation of said probability or weighting.

The classifier can be trained in the context of the method or can be created on the basis of training images and/or can already be present in stored form. For this purpose, the classifier can be created on the basis of a set of training images or image excerpts which adequately represent the different classes of target points. In particular, the training images can consist of a first set of image excerpts which represent genuine target points and the target point class of which is known, and of a second set of images of similar, but undesired, target points and images of the background of the target points which are assigned to a residue class or non-target-point class. These training images can be recorded during different times of the day and under different measurement and weather conditions in order to produce a rating method that is as robust as possible.

For training the classifier, depending on the method, a feature vector or a topology graph can be extracted from each training image in a predefined image region. A feature vector can consist of a combination of different geometrical and statistical descriptors that describe the image content unambiguously and independently of size relationships and orientation. The feature vectors of all the training images can be converted into a feature space and assume a specific position there in accordance with the features typical of the target object class. The feature space can then be subdivided, with the aid of a, more particularly machine-based, learning method, such as for example the maximum distance method (support vector machine), into regions in such a way that each class takes up the largest possible space, without overlapping another class in the process. The feature space can additionally be transformed into a higher-dimensional space in order to simplify the learning. Moreover, the dimension of the feature space can be reduced, for example by means of principal component analysis, in order to suppress statistically non-relevant information and thus to make the training of the classifier more efficient. In addition, a function that produces a relationship between given feature vector and the assignment probability thereof can be learned for each class. These functions can be learned for example by means of logistic regression.

In particular, during learning, it is possible to detect geometrical primitives in defined image excerpts and to establish a topology graph from them. In this regard, for a respective target object class corresponding reference graph structures can be generated and stored for the classification, in particular for "graph matching".

According to the invention, the search process can be rated depending on a rating, in particular by means of classification, of a target object feature of the respective target object candidate, in particular type and/or environment of the object and/or gray-scale value, gray-scale value gradient and/or histogram of a target point environment and/or geometrical primitives and/or the neighborhood relationships thereof. Furthermore, the rating of the target object feature can be effected depending on images, in particular image excerpts, that represent the target object candidates and/or are similar to the target object. Furthermore, a feature embodiment of the target object feature and an embodiment coefficient can be determined, in particular wherein the feature embodiment and the embodiment coefficient are determined depending on a position of a respective feature vector in a feature space, in particular wherein an assignment probability is determined.

If potential target objects, i.e. representatives of one or a plurality of target object classes, were able to be found in the image, e.g. by means of a method mentioned above, respective target point candidates can be derived from them. Each possible target point can be assigned a weight value or probability, said probability representing a measure of the extent to which the respective target point candidate represents the target point desired, in particular by the user. Such a rating can be based on predefined weight factors.

The weight factors can depend e.g. on the assignment probability, i.e. the quality of the classification, and/or can be derived depending on the target object class on which the target point candidate is based, in accordance with the frequency of occurrence of said target object class in a measurement environment. Furthermore, the weight factor can depend on the distance between the target point candidate and the image center. Moreover, a weight factor can be determined in accordance with the selection behavior of a user or the running measurement program.

The target point candidates can then be provided together with an information item representing their respective determined probability—on the basis of the weight factors. After the rating, therefore, either the most probable candidate, i.e. that candidate which was rated with the highest weighting, can be automatically selected by the system or—if a plurality of candidates are appropriate—the most probable candidates can be provided to the user for manual selection. According to the invention, a specific number of target point candidates can be provided in this case, in particular depending on the respective weight value.

In this case, the target point candidates can be provided in such a way that the target point candidates, in particular together with the information concerning the weight values, are provided e.g. on a display, in particular touch-sensitive display. The user can thus be afforded the possibility of selecting the desired target point from the provided set of possible target points, wherein the indication with regard to the probability or weighting can be taken into account in a supporting manner for the selection of the target point. Moreover, the target point candidates together with the information relating to the probability or the weight value can be provided in such a way that an automatic selection of a target point from the candidate set can be effected in the context of the method. In this case, e.g. that target point candidate to which a higher, in particular significantly higher, weighting value in relation to further target point candidates is assigned can be selected automatically.

According to the invention, therefore, in the context of the method, the target point can be determined from the provided target point candidates and the information item representing the weight value assigned to the respective target point candidate by a user or automatically. In particular, that target point candidate which is assigned a larger weight value or a higher probability relative to further target point candidates can automatically be determined as the target point. Furthermore, providing the target point, the target point candidates and/or the information item representing the weight value assigned to the respective target point candidates can take place on a display.

Furthermore, with the method according to the invention, the target point properties which form the basis for calculating the probability or the weight value of the target point candidates can depend on point properties which can be determined in the detected image. In this case, the target point properties can comprise those properties or features or these can be allocated to the target point candidates which are assigned to the associated target objects. Since a user can attempt to target a desired target point as precisely as possible (in the image center), the position of a possible target object in the image can influence the weighting for example in this case. Furthermore, the assignment to a specific target object class can affect the weighting. By way of example, in the case of forms which correspond to a design of a retroreflector or predominant objects in a measurement environment (e.g. summit cross or church tower), a weighting in favor of a higher target point probability can be effected.

According to the invention, therefore, the target point property can be dependent on a respective target object class, a position of the target point candidate in the image and/or a reflectivity of the respective target object candidate.

Moreover, the method according to the invention can be performed automatically after the measuring device has been coarsely aligned, such that, for example, a user merely targets a desired target point and, as the result of the targeting, is provided with an already selected target point corresponding, in particular, to the desired target point. In addition, a fine targeting of this target point can be effected manually or likewise automatically by means of determining the offset of a current alignment of the measuring device with respect to the desired target point and realigning the measuring device with the target point.

According to the invention, therefore, an offset of a targeting point defined by the targeting direction with respect to the target point can be determined in the image and the targeting direction is aligned depending on the offset in such a way that the target point is targeted.

A further aspect of the invention is a geodetic measuring device, in particular total station or theodolite, for providing target point candidates for selecting a target point, comprising a targeting unit, in particular telescopic sight. The targeting unit is pivotable relative to a base of the measuring device for changing the alignment thereof in two axes, wherein the targeting unit defines a targeting direction and has at least one camera for detecting an image substantially in the targeting direction. Furthermore, provision is made of an angle measuring functionality for highly precisely detecting the alignment of the targeting direction and output means for providing information. In addition, the measuring device comprises a control and processing unit. Models for target object recognition by means of image processing and coefficients for a rating of target point properties of the target point candidates are stored in a database. Furthermore, the measuring device has a search functionality in the context of which after detection of an image during performance of the search functionality by the control and processing unit in the image a search is made for the target object candidates depending on a degree of correspondence with the models, in particular by means of a classification method, wherein the target object candidates are respectively assigned at least one point representing the target object candidate as target point candidate. Furthermore, in the context of the search functionality, the target point candidates are assigned a candidate set and depending on the coefficients of respective weight values, in particular probabilities, are derived for the respective target point candidates and are assigned to the target point candidates. In addition the target point candidates are respectively provided together with an information item representing the weight value assigned to the respective target point candidate, in particular on the output means. Such a measuring device according to the invention can additionally be designed such that a described method according to the invention can be carried out, i.e. the measuring device can provide the search functionality in such a way that an above-described method according to the invention is carried out when the search functionality is implemented.

The invention additionally relates to a computer program product comprising program code stored on a machine-readable carrier, for carrying out a method according to the invention for providing target point candidates for selecting a target point from the target point candidates particularly when the program is executed on an electronic data processing unit designed as a processing unit of a geodetic measuring device according to the invention.

BRIEF DESCRIPTION OF THE DRAWINGS

The method according to the invention and the measuring system according to the invention are described in greater detail purely by way of example below on the basis of concrete exemplary embodiments illustrated schematically in the drawings, wherein further advantages of the invention will also be discussed. In the figures specifically.

DETAILED DESCRIPTION

Figures 1A, 1B:
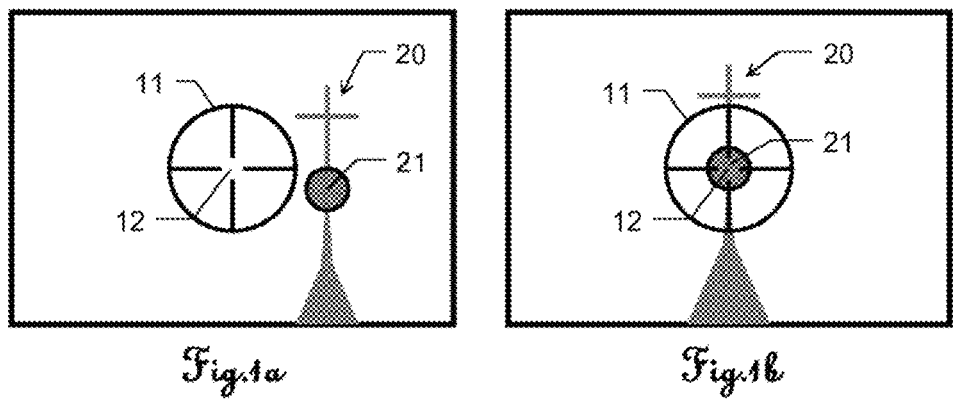
FIGS. 1a-b show an alignment of a targeting direction of a measuring device with a desired target point according to the prior art.

FIGS. 1a and 1b show an alignment process for a measuring device according to prior art. During the targeting of a desired point 21 of an object 20, illustrated here as a church spire, the alignment of a targeting unit of a measuring device, e.g. of a theodolite or of a total station, is varied in such a way that the center 12 of a reticle 11 indicating the alignment of the targeting direction coincides with the target point 21 (FIG. 1b). In this case, a user can sight the target point 21 by means of a sight and coarsely align the telescope with the object 20 by rotation. In a second step, the user can look through the telescope and in this case achieve a precise alignment with the target point 21 by rotation on precision drives of the measuring device.

This process can prove to be very time-consuming in practice, wherein the targeting accuracy additionally depends on the user's abilities.

The alignment can furthermore be effected—depending on the shape of the target object—with an automatic targeting function (automatic target recognition, ATR), which enables a precise automatic alignment of the telescope e.g. with a reflector. What proves to be disadvantageous here is that the targeting functions only on reflectors and not on natural target points 21.

Furthermore, total stations with a "tap and turn" function are obtainable nowadays. In this case, with an integrated camera, a live image in the targeting direction can be recorded and represented on a display—on the measuring device or a controller. The user can use a pen to select a desired point 21, with which the telescope is then automatically aligned. In this case, the targeting accuracy is once again limited by the user's ability to hit the target point 21 with the pen at the correct location on the display. This process can be made more difficult particularly in the case of measurements for far removed targets and taking account of resolution limits of the display.

Moreover, methods are known by which a measuring instrument can be aligned with a non-reflective target automatically and with high accuracy. However, this presupposes that the outer shape of the target object 20 is known, e.g. by using defined target tables which are fixed to the target point 21 for the measurement, and is stored in the form of a corresponding target mark pattern on the measuring instrument.

Figure 2:
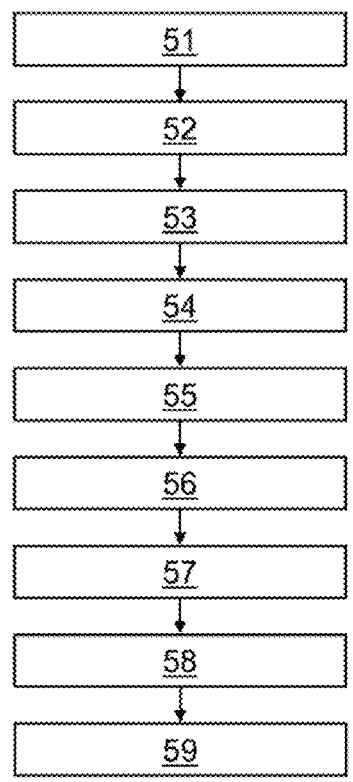
FIG. 2 shows a schematic sequence of the method according to the invention.

FIG. 2 shows a schematic sequence of a method according to the invention. The invention is based on the concept of supporting a user during the targeting of a desired target point 21 and of achieving a very precise targeting of this point 21 from a set of possible target points by using image processing methods.

In this case, in a first step 51, the telescope of the measuring device can be coarsely aligned with the target point 21 by the user. This can be done by manual rotation of the telescope or by the "tap and turn" function. Next, with a camera integrated in the measuring device, it is possible to record an image substantially in the targeting direction 52, which image is analyzed with regard to possible target objects by means of methods of digital image processing. In this case, structures detected in the image can be compared with models stored in the measuring device and objects can thus be recognized and identified as possible target objects 53.

For each target object, at least one possible target point is then derived 54.

These possible target points are then combined in a set, wherein each element of this set is rated or weighted 55 with regard to that probability that the corresponding point is the target point 21 which is desired by the user and which is intended to be targeted if appropriate automatically by the system.

In a next step 56, the set of possible target points can then be provided together with an information item, in particular with the determined weighting or probability, in terms of data e.g. for the user on the display or in the measuring device. In this case, with probabilities or weightings of similar magnitude, the user can be offered, in particular, a specific number of the candidates—e.g. only those having the highest probabilities or weightings—for manual selection.

Depending on the distribution of the probabilities or weightings respectively determined for possible target points, either the user manually or the system automatically can then select 57 a point from the set of detected and provided points, in particular that point having a significant probability or weighting.

After the selection, in a further step 58, once again by means of methods of digital image processing, it is possible to measure the deviation of the selected target point 21 from the current targeting direction in the image and to determine, on the basis thereof, correction angles for a realignment of the targeting direction. These can be transmitted to motor-driven drives for aligning the telescope and thus serve for a precise alignment 59 of the telescope with the target point 21.

Figure 3A:
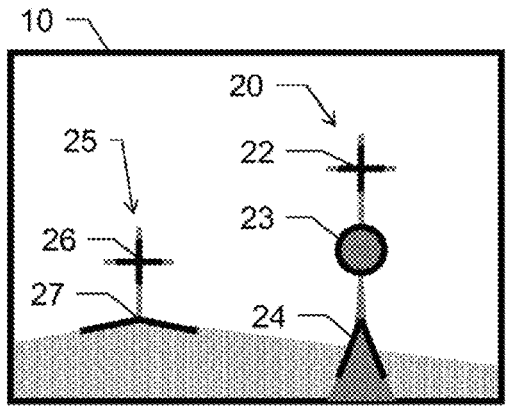
FIGS. 3a-c show a detection according to the invention of target point candidates in a detected image by means of a topology graph.
Figure 3B:
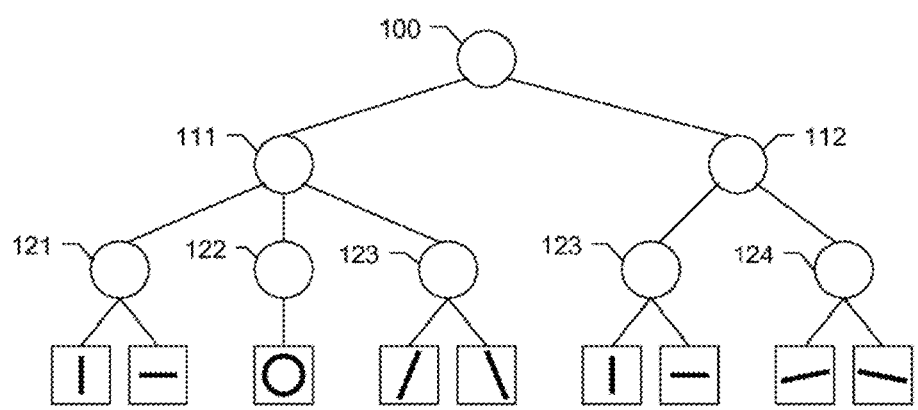
Figure 3C:
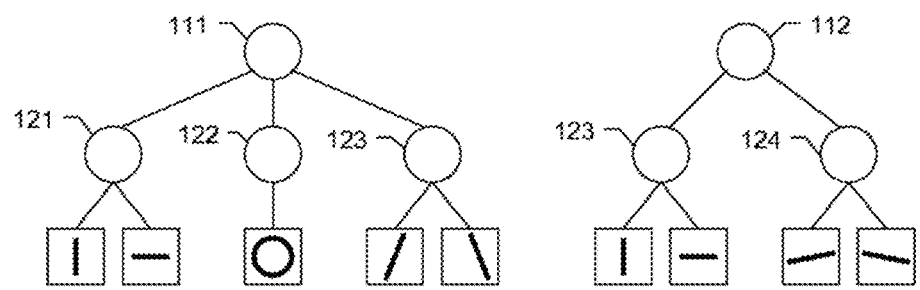

FIG. 3a shows a detection according to the invention of possible target object candidates 20, 25 in a detected image 10, wherein a classification according to the invention of the possible target object candidates 20, 25 is described below in joint consideration with FIGS. 3b and 3c. In this case, FIGS. 3b and 3c show a form according to the invention of the classification of target object candidates 20, 25 on the basis of a topography graph.

The recorded image 10 can be examined with regard to possible target objects 20, 25, that is to say that all objects in the image which are appropriate as candidates for the automatic targeting are intended to be determined automatically. In the case shown, target points of a church spire 20 and of a summit cross 25 are determined.

This image analysis can be effected on the basis of classification methods. In a first variant, the image can be searched for geometric primitives, such as e.g. lines, circles, ellipses. On the basis of the neighborhood relationships of the detected primitives, it is possible to establish a topography graph 100 (FIG. 3b) of the entire image, the type, position and the combination with neighboring geometric primitives being taken into account. Through the combination of primitives, it is thus possible to detect e.g. crosses 22, circles 23 or vertexes 24, wherein a joint consideration of these objects can define a church spire 20.

The topology graph 100 derived from the church spire 20 and the summit cross 25 shown in FIG. 3a is composed of the nodes "church tower" 111 and "summit cross" 112. The node "church tower" in a further subdivision consists of the nodes "cross" 121, "cupola" 122 and "vertex" 123, and these in turn consist of individual geometric primitives. Methods of digital image processing, such as e.g. the Hough transformation, can be used for finding these primitives in the image.

In the system, reference graph structures 111, 112 corresponding to the individual target object classes can be stored as reference models which are sought in the topology graph 100 generated from the image 10. FIG. 3c shows a reference structure 111 corresponding to the target object class "church tower", and a reference structure 112 corresponding to the target object class "summit cross".

In the context of the classification, it is thus possible to seek the stored graph structures in a graph which was generated from the image. The method of "graph matching", inter alia, is known for finding certain topological structures in the graph.

Possible target points 22, 23, 24, 26, 27 are derived from the possible target objects 20, 25 detected in the image 10. Among said target points, it is then necessary to identify the one which the user wants to target. For this purpose, given a multiplicity of target point candidates 22, 23, 24, 26, 27, the latter can be subjected to a rating of that probability according to which each individual target point 22, 23, 24, 26, 27 detected in the image is the target point 21 desired by the user.

This weighting of the individual target point candidates can be effected on the basis of predefined weight factors, the product of these individual weight factors producing a total weight value for the target point candidate. Since the user can already attempt to hit the desired target point 21 with the coarse targeting, one weight factor can be the distance of the candidate 22, 23, 24, 26, 27 relative to the current alignment (reticle 11) of the measuring device. That is to say that possible target points in the image center can acquire a higher rating than points situated at the edge of the detected image 10.

Figure 5:
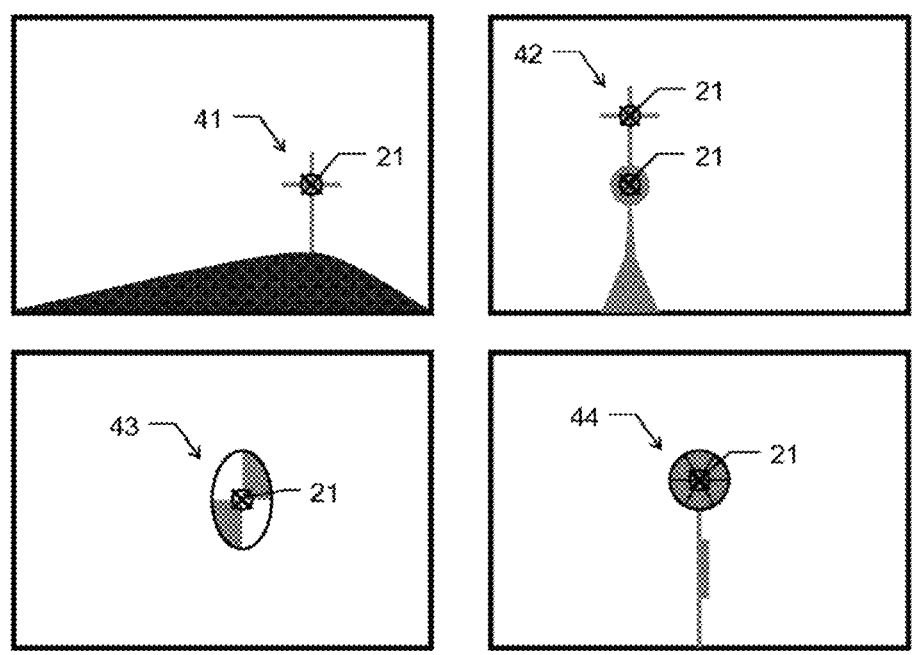
FIG. 5 shows images detected by a measuring device according to the invention with different target object candidates with respective target points.

A further weight factor can be based on the frequency of the occurrence of a target point 22, 23, 24, 26, 27 or target point 21 associated with a specific target object class in practice during measurement. Accordingly, as shown in FIG. 5, by way of example, round prisms 44 very often represent desired target points 21 and can—if the latter are identified as round prisms 44—thus cause an increased weight value and/or be provided with a corresponding more strongly weighted coefficient. Summit crosses 41, church spires and/or specific target point markings or target tables 43 can also firstly be identified on a detected image and secondly in each case represent at least one target object candidate, wherein two target points 21 can be simultaneously defined e.g. by a specific embodiment of the church spire.

Furthermore, an individual behavior of the user during a manual selection can also influence the determination of the weight value or the relevance as to the extent to which a target point candidate represents the desired target point. If e.g. the user very often selects a representative of the class "church tower" and in the latter the center of the cupola, this can be detected by the system and taken into account, in particular automatically, in future ratings.

Moreover, further criteria for the weighting can be derived from the settings of the measuring instrument or the running measurement program. If e.g. a distance measuring mode is set to "reflectorless", a possible target point 22, 23, 24, 26, 27 associated with the class "round prism" can be rated with a lower weight value. Likewise, in the context of a measuring program, the user can be requested e.g. to measure a polygon point on which a reflector is positioned. In this case, a possible target point associated with the class "round prism" would be rated with a correspondingly higher probability.

In order to derive the weight value it is additionally possible to define a function or an algorithm which on the basis of a plurality of weight factors (e.g. association of the target point candidate 22, 23, 24, 26, 27 with a specific target object class in connection with the assignment probability with respect to this class and/or distance in the image 10 from the reticle) determines a total weight value which can be allocated to the target point candidate 22, 23, 24, 26, 27.

Figure 4A:
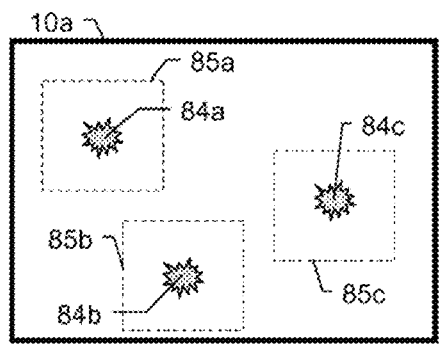
FIGS. 4a-c show a form according to the invention of the classification of target point candidates identified in the image by means of feature vectors and the position thereof in the feature space.
Figure 4B:
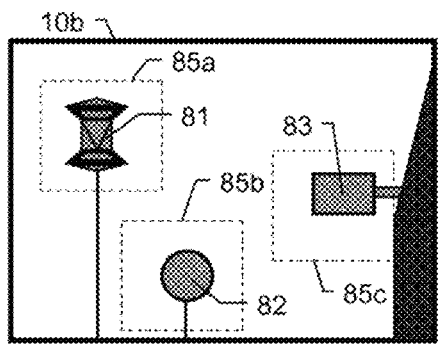
Figure 4C:
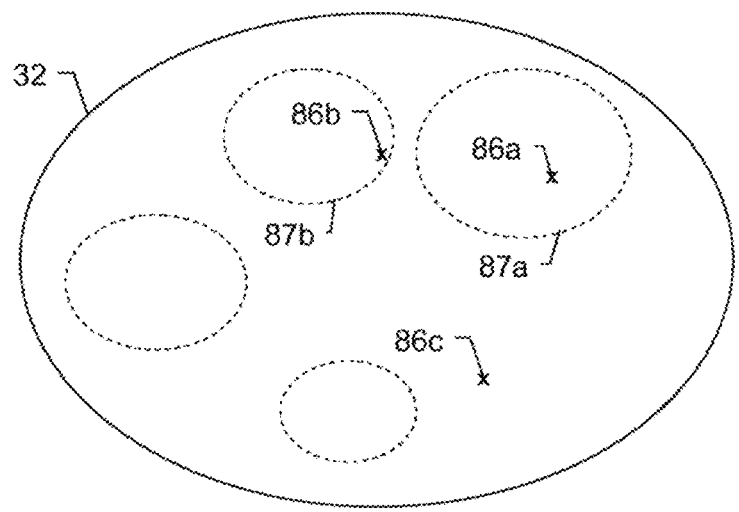

FIGS. 4a and 4b respectively show an image 10a, 10b of a measurement environment, wherein in FIG. 4a an image 10a was detected by means of an ATR unit and in FIG. 4b an image 10b was detected by means of a camera. Moreover, FIG. 4c shows a feature space 32 with feature vectors 86a, 86b, 86c generated from the image 10b. By means of the ATR, the image 10a is recorded and the reflections of a laser beam 84a, 84b, 84c emitted by the ATR are detected in said image. On the basis of the reflections 84a, 84b, 84c, in the ATR image by itself it is possible only with difficulty to evaluate whether the reflected laser was reflected from a 360° prism 81, a round prism 82, or some other object, e.g. a rear mirror 83 of a vehicle.

In this case, in the context of the invention, the positions of the laser spots 84a, 84b and 84c can function as "interest points" and thus define the position of the image excerpts 85a, 85b, 85c in the recorded image 10b. Feature vectors 86a, 86b, 86c (FIG. 4c) can furthermore be generated from said image excerpts, said feature vectors being mapped into the feature space 32.

Regions 87a, 87b corresponding to the individual target object classes are defined in said feature space 32. The classification involves evaluating, on the basis of the "positioning" of the feature vector 86a, 86b, 86c in the feature space 32, to which target object class the corresponding image excerpt 85a, 85b, 85c should be assigned. In this regard, here e.g. the feature vectors 86a and 86b become located in the regions 87a and 87b, which can correspond e.g. to the target object classes "360° prism" and "round prism". Since the feature vector 86c lies outside the defined regions, it cannot be assigned to a target object class.

Alongside the assignment of the individual image excerpts 85a, 85b, 85c to the target object classes, the classification also yields as the result an assignment probability describing the quality of the assignment. The latter can be derived e.g. from the position of the feature vector 86a, 86b, 86c within a region 87a, 87b. If a vector 86a lies more or less in the center of a region, its assignment probability will be high, e.g. 90%; if a vector 86b lies rather at the edge of a region or in closer proximity to another region, the assignment probability will be rated lower.

Furthermore, the user can be afforded the possibility for the user to define target object classes for which the system automatically generates an associated classifier or correspondingly adapts the existing classifier.

Moreover, the classification can be improved by additional information influencing the process. Since e.g. the size of a round prism is known, the size of the prism in the image 10b can be derived from the distance to the object given knowledge of the optical imaging parameters. The sizes of other objects, e.g. summit crosses or cupolas on church towers, also generally vary within certain limits. The distance to the object can be determined by means of a distance measuring functionality of the measuring instrument or can be derived from the position of the focusing lens of the targeting device.

Figure 6:
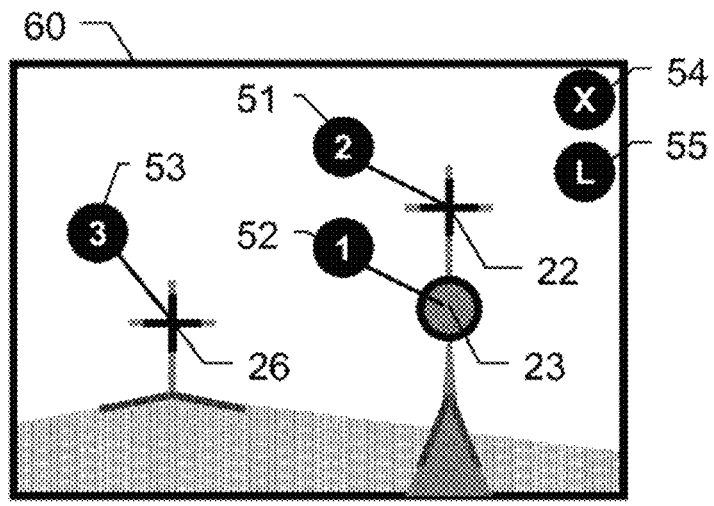
FIG. 6 shows a provision according to the invention of target point candidates with respective assigned information items.

FIG. 6 shows a provision according to the invention of target point candidates 22, 23, 26. For this purpose, a detected image was correspondingly searched for possible target object candidates, and the target point candidates 22, 23, 26 were derived therefrom and weighted as possible targets with regard to their probability and, particularly in order to select one of the possible targets as the target point, were provided with labels 51, 52, 53 which enable selection by actuation of the corresponding key on the operating panel or by tapping the label 51, 52, 53 using a pen, provided. If the weight value or probability of a possible target point were significantly greater than for all the others, this can be selected by the system without further interaction on the part of the user. For such a decision as to whether a weight value or one of the probabilities is significantly greater than the other weight values or probabilities, it is possible to use a predefined threshold value in the case of which an automatic selection can be effected when said threshold value is exceeded.

If a plurality of candidates having similar weight values are present, the selection can be effected manually by the user. For this purpose, by way of example, a predefined number of possible target points—to be precise e.g. those having a highest weight value or a highest relevance—can be marked in the image and provided e.g. with a marker or a label 51, 52, 53. The user can thus carry out the selection of the target point by tapping the marker in the display 60, for example using a pen, or by pressing a key corresponding to the marker or label on the operating panel of the measuring instrument.

Furthermore, a further selection for the termination 54 of the automatic targeting function can be present in the display 60. If this selection is made by the user, the information regarding the target point candidates 22, 23, 26 can be masked out and the reticle of the targeting unit can be inserted, such that the user can manually target a target point in a known manner.

Moreover, there can be a selection for learning 55 new target points, wherein the desired target point can once again be targeted manually by the user. By selecting this function, after targeting, the user can be afforded the possibility of allocating the targeted target point to an already existing target object class or of generating a new user-defined target object class. The system generates a feature vector from an image excerpt of defined size around the reticle and maps said feature vector in an associated feature space, where, by means of a variation of existing class limits, the classifier can be adapted to taking account of this new target point and thus in future identify target points of this type as possible target point candidates 22, 23, 26.

Figure 7:
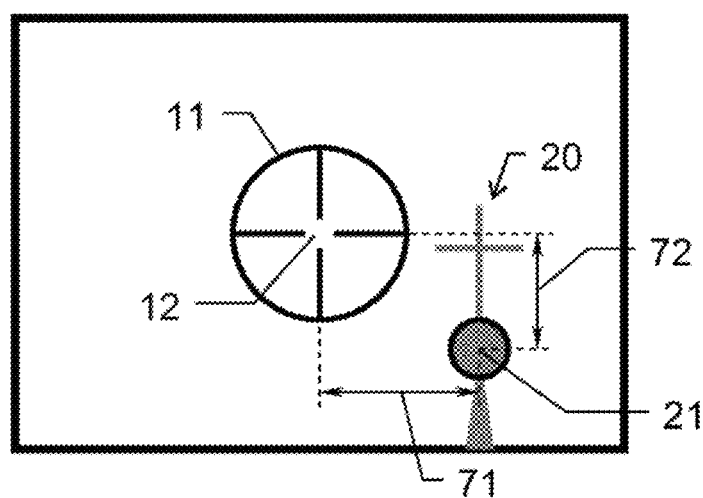
FIG. 7 shows a determination of the offset of a desired target point from a current alignment of the measuring device.

FIG. 7 shows a determination of the positional offset of a desired target point 21 of the target object 20 from a current alignment of the measuring device. In this case, the offset can be understood as a difference in position between a center 12 of the reticle 11 or between a targeting point defined by the alignment of the targeting unit in the image and the desired or selected target point 21. The offset between the points can be determined by means of image processing in two directions 71, 72, wherein the respective direction offset 71, 72 can in each case indicate a distance between the desired target point 21 and the center 12 of the reticle.

Depending on the optical parameters of the targeting unit, in particular of the telescope, (e.g. focal length) and the integrated camera (e.g. pixel size), the offset can furthermore be converted into correction angles for the realignment of the targeting unit or the measuring device. These corrections can be communicated to the motorized pivoting drives of the targeting unit and thus serve for the precise realignment of the targeting unit with the desired target point 21, wherein this alignment can be carried out in an automatically controlled manner.

Moreover, the specific offset 71, 72 can be displayed on the display 60. Therefore, a user—as an alternative to the automatic alignment—can manually perform the realignment of the targeting unit by adjusting precision drives of the targeting unit in such a way that the difference in position becomes zero. In this case, the direction offsets 71, 72 on the display 60 can be updated constantly, in particular continuously, and thus display alignment progress to the user.

It goes without saying that these illustrated figures merely schematically illustrate possible exemplary embodiments.

The various approaches can, according to the invention, likewise be combined with one another and with methods and devices for targeting target points and with measuring devices from the prior art.

What is claimed is:

1. A method for providing target point candidates that form a candidate set for selecting a target point from the candidate set by means of a geodetic measuring device, wherein the measuring device has a targeting unit defining a targeting direction and a camera aligned substantially in the targeting direction, the method comprising:
    coarsely aligning the measuring device with the target point;
    detecting an image in the targeting direction;
    searching for specific target object candidates in the detected image is effected by means of image processing, wherein:
        the search process is effected on the basis of predefined models;
        the target object candidates are respectively assigned at least one point representing the respective target object candidate as target point candidate;
    the target point candidates are assigned to the candidate set;
    a respective weight value is derived and assigned to the target point candidates; and
    the target point candidates of the candidate set are respectively provided together with an information item representing the weight value assigned to the respective target point candidate.

2. The method as claimed in claim 1, wherein searching for specific target object candidates in the detected image is effected by means of a classification method.

3. The method as claimed in claim 1, wherein the respective weight value includes a probability depending on at least one embodiment of a predetermined target point property of the target point candidate.

4. The method as claimed in claim 1, wherein the search process is effected depending on a rating.

5. The method as claimed in claim 4, wherein the search process is effected depending on the rating means by means of classification of a target object feature of the respective target object candidate, type and/or environment of the object and/or gray scale value, gray scale value gradient and/or histogram of a target point environment and/or geometrical primitives and/or the neighborhood relationships thereof.

6. The method as claimed in claim 4, wherein the rating of the target object feature is effected depending on images that represent the target object candidates and/or are similar to the target object.

7. The method as claimed in claim 4, wherein the rating of the target object feature is effected depending on image excerpts that represent the target object candidates and/or are similar to the target object.

8. The method as claimed in claim 4, wherein a feature embodiment of the target object feature and an embodiment coefficient are determined depending on a position of a respective feature vector in a feature space and an assignment probability is determined.

9. The method as claimed in claim 1, wherein a specific number of target point candidates are provided depending on the respective weight value.

10. The method as claimed in claim 1, wherein the target point is determined from the provided target point candidates and the information item representing the weight value assigned to the respective target point candidate by a user or automatically.

11. The method as claimed in claim 1, wherein that target point candidate which is assigned a larger weight value relative to further target point candidates is automatically determined as the target point.

12. The method as claimed in claim 1, wherein providing the target point, the target point candidates and/or the information item representing the weight value assigned to the respective target point candidate takes place on a display.

13. The method as claimed in claim 1, wherein the target point property is dependent on a respective target object class, a position of the target point candidate in the image and/or a reflectivity of the respective target object candidate.

14. The method as claimed in claim 1, wherein an offset of a targeting point defined by the targeting direction with respect to the target point is determined in the image and the targeting direction is aligned depending on the offset in such a way that the target point is targeted.

15. The method as claimed in claim 1, wherein the method is performed automatically after the measuring device has been coarsely aligned.

16. A geodetic measuring device for providing target point candidates for selecting a target point, comprising:
    a targeting unit, wherein the targeting unit:
        is pivotable relative to a base of the measuring device for changing the alignment thereof in two axes;
        defines a targeting direction; and
        has at least one camera for detecting an image substantially in the targeting direction;
    angle measuring functionality for highly precisely detecting the alignment of the targeting direction;
    output means for providing information; and
    a control and processing unit, wherein:
        models for target object recognition by means of image processing and coefficients for a rating of target point properties of the target point candidates are stored in a database; and
        the measuring device has a search functionality in the context of which after detection of an image during performance of the search functionality by the control and processing unit, wherein:
            in the image a search is made for the target object candidates depending on a degree of correspondence with the models and the target object candidates are respectively assigned at least one point representing the target object candidate as target point candidate;
            the target point candidates are assigned to a candidate set;
            depending on the coefficients respective weight values are derived for the respective target point candidates and are assigned to the target point candidates; and
            the target point candidates are respectively provided together with an information item representing the weight value assigned to the respective target point candidate.

17. The geodetic measuring device as claimed in claim 16, wherein the geodetic measuring device is a total station or theodolite.

18. The geodetic measuring device as claimed in claim 16, wherein the target point candidates are respectively provided together with an information item representing the weight value assigned to the respective target point candidate on the output means.

19. The geodetic measuring device as claimed in claim 16, wherein the weight values include probabilities.

20. The geodetic measuring device as claimed in claim 16, wherein the targeting unit includes a telescopic sight.

21. The geodetic measuring device as claimed in claim 16, wherein in the image the search is made for the target object candidates depending on the degree of correspondence with the models by means of a classification method.

22. The geodetic measuring device as claimed in claim 16, wherein the measuring device provides the search functionality in such a way that a method as claimed in any one of claim 1 is carried out during the performance of the search functionality.

23. A tangible non-transitory computer program product comprising program code stored on a tangible non-transitory machine readable carrier, for carrying out the method for providing target point candidates for selecting a target point as claimed in claim 1.

* * * * *